(No Model.)

E. JOHNSON & J. BARNES.
COOLER FOR LIQUIDS AND SOLIDS.

No. 290,687. Patented Dec. 25, 1883.

Witnesses:

Inventors:
Elmore Johnson
Jackson Barnes
by
Melville Church
Their Attorney.

UNITED STATES PATENT OFFICE.

ELMORE JOHNSON AND JACKSON BARNES, OF BURLINGTON, VERMONT.

COOLER FOR LIQUIDS AND SOLIDS.

SPECIFICATION forming part of Letters Patent No. 290,687, dated December 25, 1883.

Application filed July 6, 1883. (No model.)

*To all whom it may concern:*

Be it known that we, ELMORE JOHNSON and JACKSON BARNES, both of Burlington, in the county of Chittenden and State of Vermont, have invented a certain new and Improved Cooler for Liquids and Solids; and we do hereby declare the following to be a full, clear, and exact description of the same, reference being had to the accompanying drawings, forming a part of this specification, and to the figures and letters of reference marked thereon.

Our invention has for its object to provide an improved means for cooling liquids or solids in an easy and expeditious manner; and it consists of an improved structure arranged and adapted for operation in the manner hereafter described and claimed.

Figure 1:
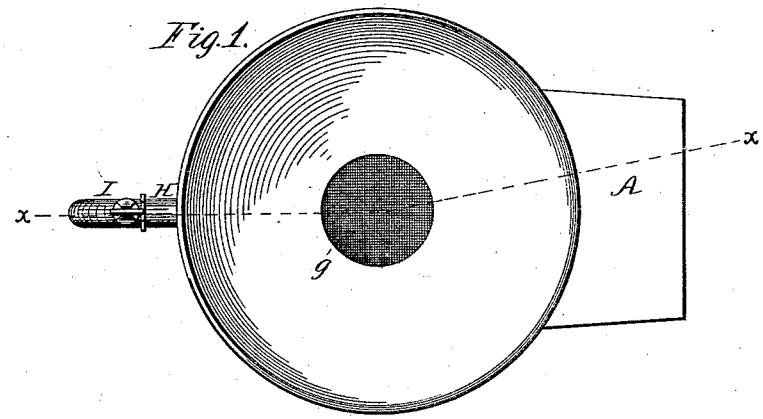
Figure 2:
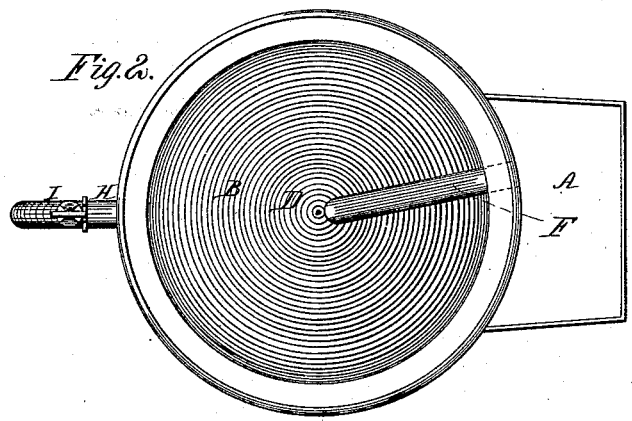
Figure 3:
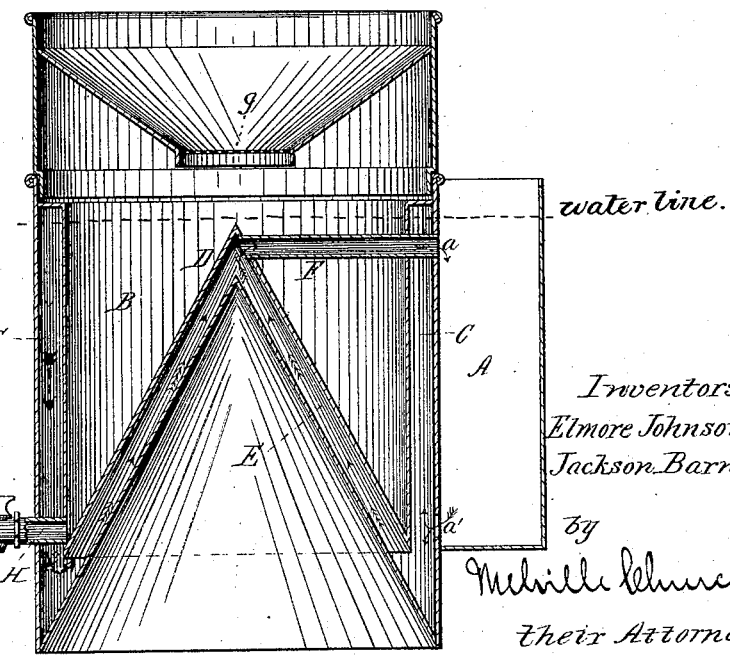

Referring to the accompanying drawings, Figure 1 represents a top plan view of a cooler constructed in accordance with our invention. Fig. 2 is a similar view with the top of the cooler removed. Fig. 3 is a longitudinal vertical section taken on the line $x\ x$ of Fig. 1.

Similar letters of reference in the several figures indicate the same parts.

The cooler, as shown, consists of a receptacle, A, for ice and water or some other refrigerating-fluid, a chamber or receptacle, B, for the articles to be cooled, having double walls, between which is left a water-space, C, which communicates at the top and bottom, through openings $a\ a'$, with the receptacle containing the ice and water or other refrigerant, and an interior double-walled upwardly-extended projection, D, having preferably inclined upper surfaces, and having a water-space, E, between its walls, which communicates with the receptacle A at the bottom through the opening $a'$, and at the top through a pipe, F, as shown in Fig. 3. Upon the top of chamber B is placed a suitable cover having preferably a concave bottom provided with a central opening, $g$, covered with a strainer of wire-gauze.

To prepare the cooler, the receptacle A is first filled with ice, and then water is poured in till the said receptacle, as well as all the spaces between the double walls, is filled up to the water-line indicated by the dotted lines in Fig. 3. If, for instance, the article to be cooled is liquid, it should be slowly poured into the concave cover and allowed to pass through the sieved opening $g$ onto the central projection, D, and flow down over the inclined surface of said projection to the bottom of the chamber B. As the cold water in the space E between the double walls of the central projection absorbs the heat of the liquid being cooled, its temperature is raised, and it flows upwardly in the direction indicated by the arrows, Fig. 3, and out through the pipe F into the upper part of the receptacle A, and causes the colder water in said receptacle A to pass out through the lower passage, $a'$, and supply its place. In this way a constant circulation is kept up until the liquid being cooled attains a temperature corresponding to that of the water in the double walls. Not only does the circulation referred to take place in the space between the walls of the central projection, D, but also in the space C between the walls of the chamber B, as indicated by the dotted arrows, Fig. 3. When the temperature of the liquid operated upon has been sufficiently lowered, it may be drawn off in small quantities or all at once through a discharge-pipe, H, having a controlling-cock, I.

Where liquids or solid articles are to be kept cold within the chamber B, the cover with the central opening in it may be displaced by a tight cover of any approved construction.

We by preference make the central projection, D, of conical or pyramidal form, as such forms are best adapted for the purpose; but any other form which shall present either straight or inclined sides we regard as falling within the limit of our invention.

We are aware of the patent granted to J. B. Weis, No. 160,291, dated March 2, 1875, and disclaim all matter shown therein, as our present invention differs materially therefrom, in that a constant circulation of the refrigerant is secured without waste or loss, while the material to be cooled may be acted upon for a longer or shorter period, and may be drawn off or removed in whole or in part, as may be found desirable.

We claim as our invention—

1. The combination, with the cooling-chamber having the central double-wall projection, of the exterior receptacle for ice and water or other liquid refrigerant, and the passages connecting said receptacle with the upper and lower portions of the water-space of said projection, substantially as described, and for the purpose specified.

2. The combination, with the cooling-chamber having double walls, with the water-space between the central projection within said chamber, also having double walls with a water-space between, of an exterior receptacle for ice and water or other refrigerant, and passages leading from the upper and lower portions of the spaces between said double walls of chamber and projection to the upper and lower portions of the said exterior receptacle, substantially as described.

3. The combination of the cooling-chamber, the interior central double-wall projection, the exterior receptacle, the passage between the said receptacle and the space between the walls of the projection, and the cover for the cooling-chamber, having the opening for discharging the liquid to be cooled on the projection, substantially as described.

4. The combination, with the cooling-chamber, of the interior central projection of conical form, the exterior receptacle, the passages between the said receptacle and the space between the walls of the projection, and the cover having the central perforation located in position to discharge the liquid to be cooled on the apex of the said conical projection, substantially as described.

ELMORE JOHNSON.
JACKSON BARNES.

Witnesses:
CLINTON S. KINSLEY,
ELIHU B. TAFT.